(12) United States Patent  
Czarnek

(10) Patent No.: US 7,320,570 B2  
(45) Date of Patent: Jan. 22, 2008

(54) SET SCREW WITH NITI TIP

(75) Inventor: Robert Czarnek, Johnstown, PA (US)

(73) Assignee: Czarnek and Orkin Laboratories, Inc., Highland Park, IL (US)

( * ) Notice: Subject to any disclaimer, the term of this patent is extended or adjusted under 35 U.S.C. 154(b) by 144 days.

(21) Appl. No.: 11/058,682

(22) Filed: Feb. 15, 2005

(65) Prior Publication Data

US 2005/0180839 A1    Aug. 18, 2005

Related U.S. Application Data

(60) Provisional application No. 60/545,092, filed on Feb. 17, 2004.

(51) Int. Cl.  
*F16B 35/00* (2006.01)

(52) U.S. Cl. ...................... 411/393; 411/392

(58) Field of Classification Search ............... 411/393, 411/392  
See application file for complete search history.

(56) References Cited

U.S. PATENT DOCUMENTS

| | | | | |
|---|---|---|---|---|
| 972,787 | A * | 10/1910 | Huyck .................. 403/247 |
| 1,107,177 | A * | 8/1914 | Noble ..................... 411/395 |
| 2,747,058 | A * | 5/1956 | Ulanet .................... 200/286 |
| 3,479,072 | A * | 11/1969 | Kosar ..................... 403/276 |
| 3,501,993 | A * | 3/1970 | Swenson ................ 411/393 |
| 3,645,161 | A * | 2/1972 | Wesker ................... 411/393 |
| 4,017,139 | A * | 4/1977 | Nelson ................... 439/352 |
| 5,079,508 | A * | 1/1992 | Corain et al. ............ 324/110 |
| 5,603,445 | A * | 2/1997 | Hill et al. ................ 228/4.5 |
| 6,074,147 | A * | 6/2000 | Shu ........................ 411/393 |
| 6,179,841 | B1 * | 1/2001 | Jackson .................... 606/73 |
| 6,425,829 | B1 * | 7/2002 | Julien ....................... 470/11 |
| 7,005,018 | B2 * | 2/2006 | Julien ..................... 148/563 |
| 2002/0187020 | A1 * | 12/2002 | Julien ..................... 411/544 |
| 2003/0185648 | A1 * | 10/2003 | Blaess .................... 411/393 |

OTHER PUBLICATIONS

Muir Wood et al, abstract of "Indentation characteristics of superelastic nickel-titanium wires and a preliminary study of copper-bonded joints between them" Jul. 2004, downloaded from http://adsabs.harvard.edu/abs/2004SPIE.5387..268M, 1 page.*

Small Parts, Inc, "Nitinol Super Elastic Wire" posted on or before Feb. 19, 2004, downloaded from http://web.archive.org/web/20040219185634/http://www.smallparts.com/products/descriptions/nw.cfm, 1 page.*

Richardson, Kirk, "Nitinol Technologies Innovator Redefining the Cutting Edge" OUTLOOK vol. 22 No. 2, 2nd Quarter 2001, downloaded from http://www.twca.com/WahChang/pages/outlook/pdf/2001/q2/2Q2001_outlook.pdf.*

* cited by examiner

*Primary Examiner*—Katherine Mitchell  
(74) *Attorney, Agent, or Firm*—The Webb Law Firm

(57) ABSTRACT

A set screw includes a threaded body having a hole defined therein, wherein the hole is situated along an axis of the threaded body. The set screw also includes a super-elastic alloy insert, such as a nickel-titanium alloy (NiTi) insert, partially received and secured within the hole. The NiTi insert may include a plurality of grooves adapted to allow for transverse expansion of the NiTi insert. The NiTi insert may be polygonally or cylindrically shaped. The NiTi insert may also have a substantially flat tip.

16 Claims, 3 Drawing Sheets

SET SCREW WITH NITI TIP

CROSS REFERENCE TO RELATED APPLICATIONS

This application claims the benefit of U.S. Provisional Patent Application No. 60/545,092, filed Feb. 17, 2004, and entitled "Set Screw With NiTi Tip", the contents of which are incorporated herein by reference.

BACKGROUND OF THE INVENTION

1. Field of the Invention

The present invention is directed to a set screw and, more specifically, to a set screw having an elastic insert such as a nickel-titanium alloy.

2. Description of Related Art

Set screws are typically utilized to secure a component, such as a pulley or a gear onto a shaft. Exemplary types of set screws include cup point, cone point, flat point, oval point, dog point, and soft point set screws. Cup point and cone point set screws are designed to cut into the shaft, thereby mechanically binding to the shaft. It is difficult to disassemble a component mated to the shaft by cup point or cone point set screws unless the clearance between the mated component and shaft is sufficiently large. Furthermore, the cup point and cone point set screws permanently damage the surface of the shaft. The flat point and oval point set screws are designed to cause less damage in that such screws depend on friction. Therefore, the flat point and oval point set screws carry much lower moments than the cup point and cone point set screws. However, the flat point and oval point set screws may be used within a groove or on a flat machined into the shaft in order for such screws to have substantially equal moments as the cup point and cone point set screws. Even then, though, such screws often come loose when exposed to vibration, dynamic forces, or overload. The dog point set screw is designed to fit in a groove machined into the shaft and is intended to replace dowel pins. The soft point set screw utilizes a nylon or brass insert as a tip for the screw and therefore causes no damage to the shaft. However, the nylon or brass insert tip is designed to only carry relatively small loads through friction. In due course, because of relaxation, the nylon or brass insert tip loses gripping force.

It is, therefore, desirable to overcome the above problems and others by providing a set screw designed to secure high loads, withstand dynamic loads and vibrations, and produce no damage to a securing surface.

SUMMARY OF THE INVENTION

Accordingly, I have invented a set screw including a threaded body having a hole defined therein, wherein the hole is situated along an axis of the threaded body. The set screw also includes a super-elastic alloy, such as a nickel-titanium alloy (NiTi), insert partially received and secured within the hole. The NiTi insert may include a plurality of grooves adapted to allow for transverse expansion of the NiTi insert. The NiTi insert may be polygonally or cylindrically shaped. The NiTi insert may also have a substantially flat tip.

The set screw of the present invention is designed to withstand dynamic loads and vibrations without losing as gripping force. Additionally, the set screw does not cause any damage to a shaft or other securing surface to which the set screw is attached.

Still other desirable features of the invention will become apparent to those of ordinary skill in the art upon reading and understanding the following detailed description, taken with the accompanying drawings, wherein like reference numerals represent like elements throughout.

DETAILED DESCRIPTION OF THE INVENTION

Figure 1:
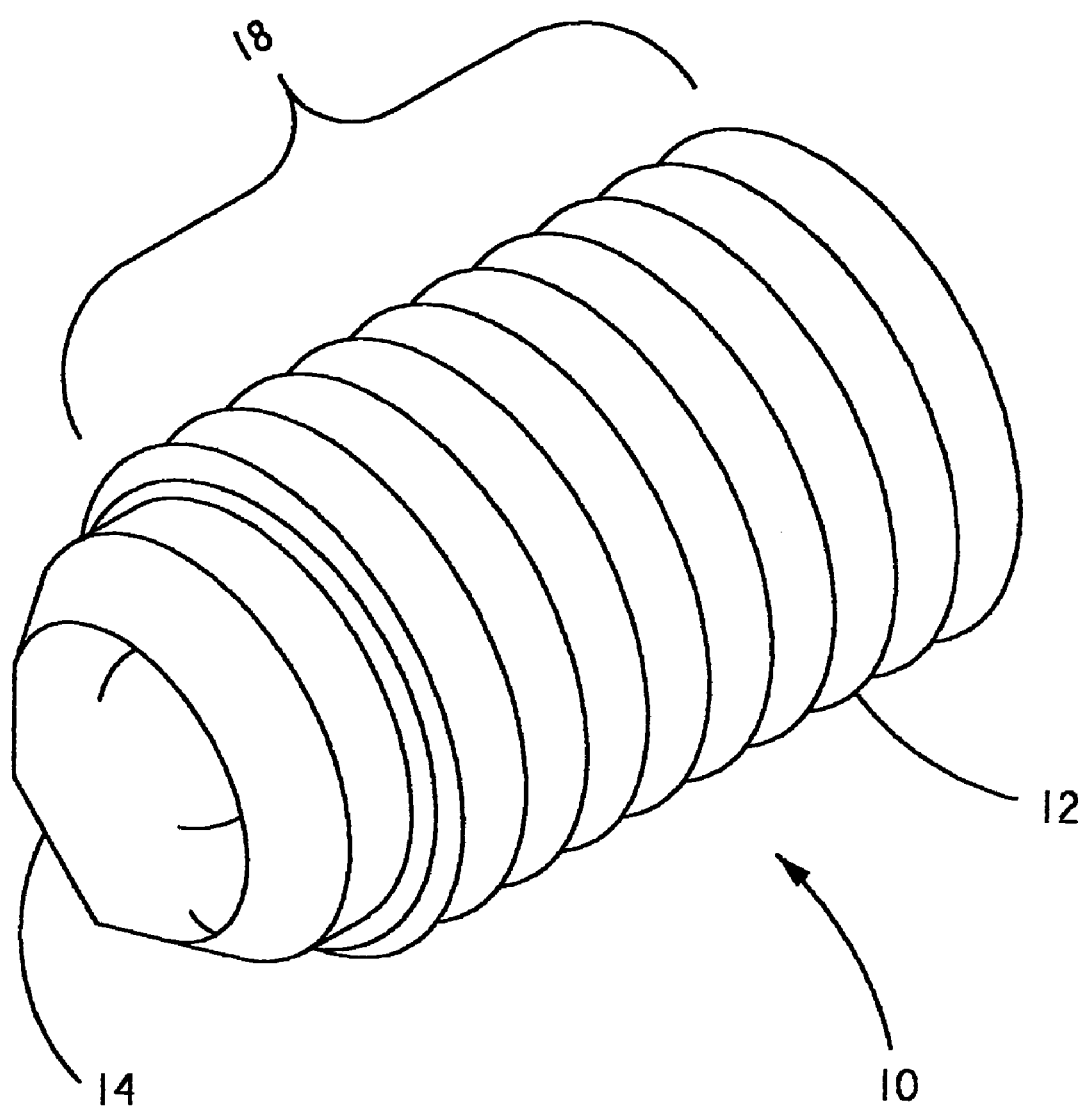
FIG. 1 is perspective view of a NiTi insert set screw in accordance with the present invention.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific apparatus illustrated in the attached drawings, and described in the following specification, is simply an exemplary embodiment of the invention. Hence, specific dimensions and other physical characteristics related to the embodiments disclosed herein are not to be considered as limiting.

Figure 2:
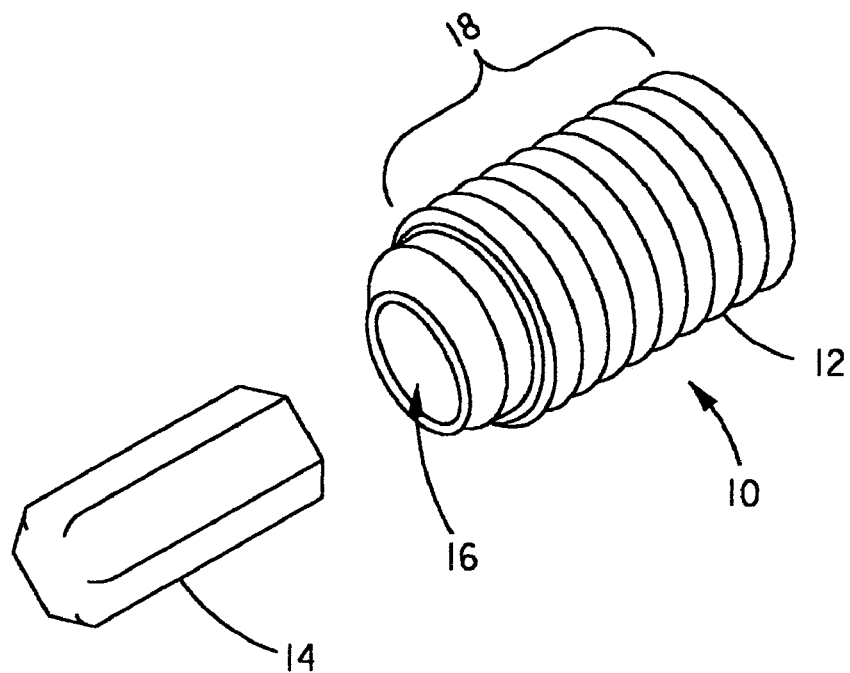
FIG. 2 is an exploded perspective view of the NiTi insert set screw of FIG. 1 in accordance with the present invention.

FIGS. 1-2 show an elastic metal insert set screw 10 having a body 12 and an insert 14 formed of a suitable elastic metal, such as NiTi. Body 12 includes a hollow tip or hole 16 partially extending into body 12 along the axis thereof. However, it is to be understood that hole 16 may be a throughbore. Desirably, hole 16 is substantially cylindrical and is sufficiently sized to receive insert 14 therein. Thus, it is to be understood that hole 16 may be sized to accommodate various sizes and shapes of insert 12. Body 12 includes a circumferential threaded arrangement 18 on an outer surface of body 12 and may extend the length thereof. It is to be understood that body 12 may include a slot (not shown) or other engagement mechanism that allows a rotational force to be imparted on NiTi insert set screw 10. It is to be understood that body 12 may be constructed of any suitable material including, but not limited to steel and other rigid metals or alloys.

Insert 14 functions as a tip for NiTi insert set screw 10. Insert 14 is either partially or wholly constructed of an elastic material. Desirably, the elastic material is a nickel-titanium alloy (NiTi), commonly known as NiTinol. NiTi exhibits superelastic properties when properly treated. Additionally, NiTi may be elastically deformed as much as 8% and maintain an induced stress with little or no creep. Because the strength and elastic modulus of NiTi is lower than that of typical steels, no damage is produced to the surface of a steel shaft against which NiTi insert set screw 10 is to be positioned against, even under large forces. Due to the elastic properties of NiTi insert 14, NiTi insert set screw 10 can withstand dynamic loads and vibrations without losing any gripping force. However, it is to be understood that insert 14 may be constructed of other material having deformation properties substantially similar to those of NiTi.

Figures 3A, 3B:
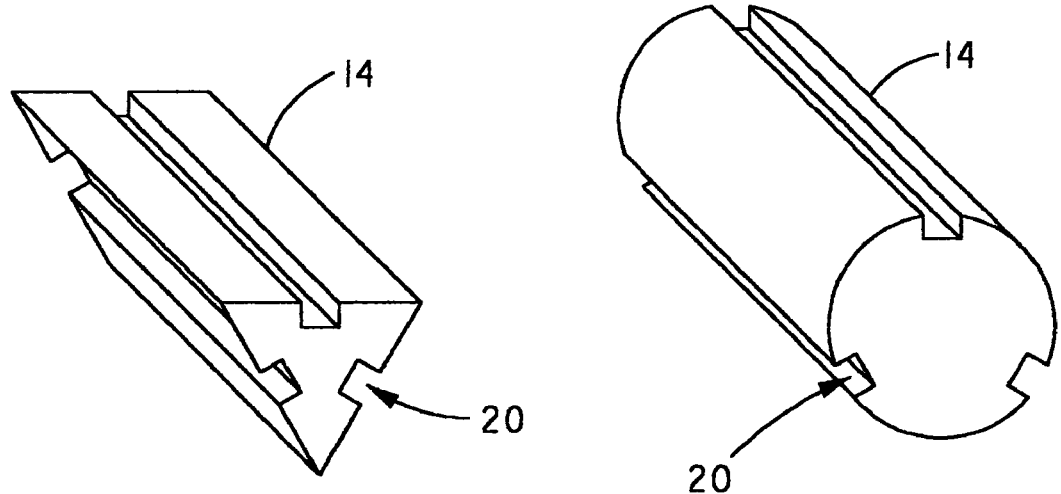
FIG. 3a is a perspective view of a polygon shaped NiTi insert having grooves.
FIG. 3b is a perspective view of a cylindrical shaped NiTi insert having grooves.

As shown in FIGS. 3a and 3b, insert 14 may be assume various geometric shapes, such as a polygon and a cylinder. It is to be understood that the polygon depiction is not to limit the variety of polygonal shapes insert 14 may assume. Furthermore, it is to be understood that insert 14 may be embodied in other suitable shapes and sizes. In order to account for a resulting Poisson effect when NiTi insert set screw 10 is applied, insert 14 may be designed to allow for transverse expansion thereof. Specifically, insert 14 may include a plurality of grooves 20 machined into and along the length of insert 14. Alternatively, insert 14 may be shaped into a prismatic bar so that the cross-section thereof is polygonally shaped. However, it is to be understood that other mechanisms that allow for transverse expansion of the insert 14, not specifically discussed herein, may be utilized in connection with insert 14 of the present invention.

Figure 4:
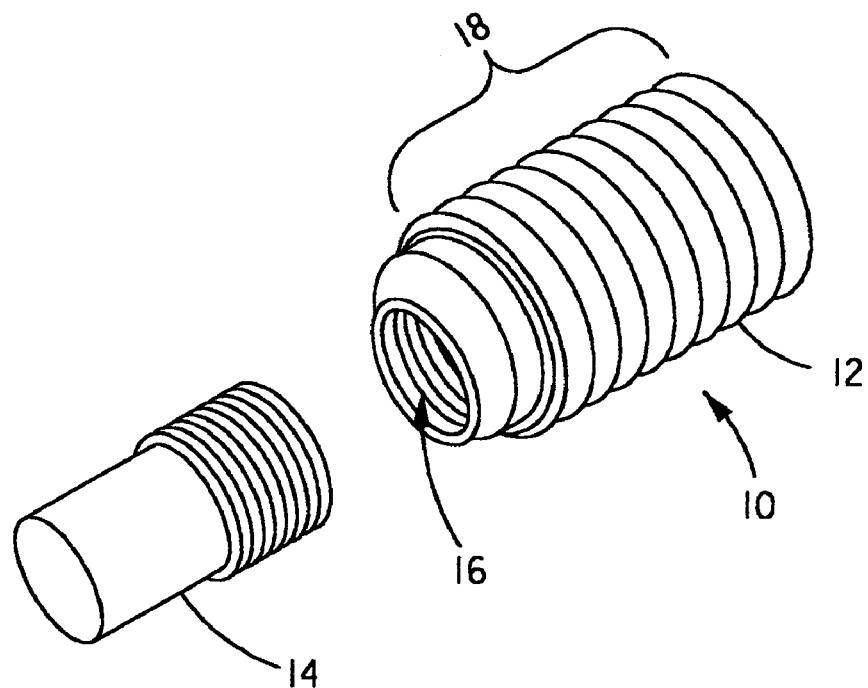
FIG. 4 is a perspective view of a NiTi insert set screw having a threaded body and a threaded insert.

Insert 14 may be secured within hole 16 through a variety of securing techniques and methods. As shown in FIG. 4, an interior surface of body 12 and an exterior surface portion of insert 14 may be threaded to provide a threaded engagement between insert 14 and body 12. Alternatively, it may be the case that only one of insert 14 or body 12 is threaded or includes raised surfaces (not shown) that provide a friction fit between insert 14 and body 12. The threaded portion of either insert 14 or body 12 may be designed to cut into the corresponding non-threaded portion of body 12 or insert 14, respectively, thereby mechanically securing insert 14 into body 12. Similar to the threadable engagement, insert 14 and hole 16 may include other types of complementary engaging or locking members (not shown) for securing insert 14 within hole 16. Still, other non-limiting securing techniques and methods include, but are not limited to press fit and gluing. However, it may also be the case that insert 14 is not secured within hole 18, but rather simply inserted into hole 18 in a loose fit manner.

Figure 5:
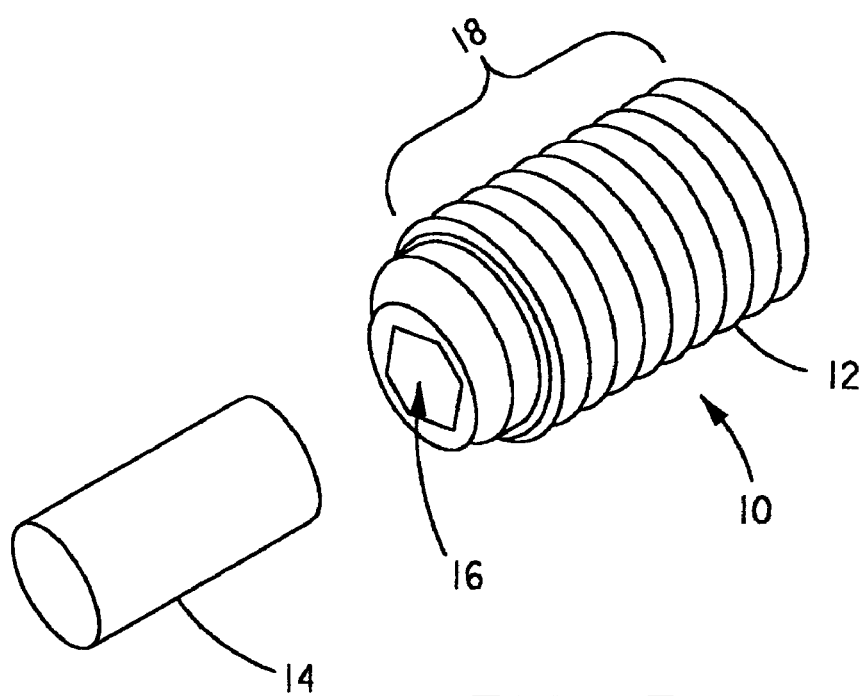
FIG. 5 is a perspective view of a NiTi insert set screw having a polygon shaped hole.

As shown in FIG. 2, a polygon shaped insert 14 may be accommodated within hole 16 having a cylindrical shape. However, as shown in FIG. 5, hole 16 may also assume other shapes, such as a polygon shape, which may be adapted to accommodate polygon shaped insert 14 of FIG. 2 or cylindrical insert 14 of FIG. 3b. Thus, it is to be understood that the shape of either insert 14 or hole 16 may vary and is not to be construed as limiting the invention.

The invention has been described with reference to the desirable embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A screw comprising:
 a threaded body having a hole defined therein, wherein the hole is situated along an axis of the threaded body and the threaded body is made of a rigid metal or alloy; and
 an insert partially received within the hole, wherein:
  the insert is constructed of an elastic metal; and
  a space is defined between an axially-extending surface of the hole and an axially-extending surface of the insert in opposition with the surface of the hole when the insert is partially received within the hole, wherein the space is defined by different shapes of the opposing surfaces of the insert and the hole, whereupon the space is configured to allow for transverse Poisson's expansion of the insert thereinto in response to compression of the insert in a direction along the longitudinal axis of the hole during use of the screw.

2. The screw of claim 1, wherein the insert is comprised of a nickel-titanium alloy.

3. The screw of claim 1, wherein the elastic metal is an alloy.

4. The screw of claim 1, further comprising means for securing the insert within the hole.

5. The screw of claim 4, wherein the means includes one of friction fit, press fit, gluing, and threadable engagement.

6. The screw of claim 1, wherein the insert is loose fit received within the hole.

7. The screw of claim 1, wherein the hole is sized to accommodate the size and shape of the insert.

8. The screw of claim 7, wherein:
 the hole is substantially cylindrical; and
 the insert is polygon shaped with a plurality of elongated sides, whereupon the space is defined between one of the sides of the insert and a surface of the hole.

9. The screw of claim 7, wherein:
 the hole is substantially polygon shaped with a plurality of elongated sides; and
 the insert is cylindrically shaped, whereupon the space is defined between at least one of the sides of the hole and a surface of the insert.

10. The screw of claim 1, wherein the insert is shaped as a prismatic bar and the cross-section of the prismatic bar is polygon shaped.

11. The screw of claim 1, wherein the screw is a flat tip set screw.

12. The screw of claim 1, wherein the rigid metal or alloy is steel.

13. The screw of claim 1, wherein said screw is a set screw.

14. The screw of claim 1, further including at least one of the following: a groove in the surface of the hole or a groove in the surface of the insert, wherein each groove is configured to allow for transverse Poisson's expansion of the insert thereinto in response to compression of the insert in a direction along the longitudinal axis of the hole during use of the screw.

15. The screw of claim 14, wherein the insert is threaded, whereupon the groove is defined between the threads of the insert.

16. The screw of claim 14, wherein an interior surface of the hole is threaded, whereupon the groove is defined between the threads of the hole.

* * * * *